US012743766B2

(12) United States Patent
Yabe

(10) Patent No.: US 12,743,766 B2
(45) Date of Patent: Sep. 22, 2026

(54) INSPECTION APPARATUS, METHOD OF CONTROLLING THE SAME, PRINTING SYSTEM, AND STORAGE MEDIUM

(71) Applicant: CANON KABUSHIKI KAISHA, Tokyo (JP)

(72) Inventor: Takashi Yabe, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 708 days.

(21) Appl. No.: 18/098,857

(22) Filed: Jan. 19, 2023

(65) Prior Publication Data

US 2023/0245298 A1 Aug. 3, 2023

(30) Foreign Application Priority Data

Jan. 28, 2022 (JP) ................................. 2022-012031
Sep. 22, 2022 (JP) ................................. 2022-151804

(51) Int. Cl.
*G06T 7/00* (2017.01)
*G06T 3/403* (2024.01)

(52) U.S. Cl.
CPC .............. *G06T 7/001* (2013.01); *G06T 3/403* (2013.01); *G06T 2207/30144* (2013.01)

(58) Field of Classification Search
CPC ..................... G06T 7/001; G06T 3/403; G06T 2207/30144; G06T 7/0004; G06V 30/133
See application file for complete search history.

(56) References Cited

U.S. PATENT DOCUMENTS 5,299,308 A * 3/1994 Suzuki ............... G06K 15/1209 358/1.9
8,780,378 B2 7/2014 Yamamoto
2013/0250319 A1* 9/2013 Kaneko ................... G06T 7/001 358/1.9
2018/0225809 A1* 8/2018 Washio .................... H04N 1/41
2018/0268534 A1* 9/2018 Kaneko ................... G06T 7/001
(Continued)

FOREIGN PATENT DOCUMENTS

JP 2013-101015 A 5/2013

OTHER PUBLICATIONS

Downsampling and Upsampling of Images; by Chaubey, 2020 (Year: 2020).*

*Primary Examiner* — Gregory A Morse
*Assistant Examiner* — Ty Mitchell Beatty
(74) *Attorney, Agent, or Firm* — VENABLE LLP

(57) ABSTRACT

An inspection apparatus obtains image data to be inspected by reading printed matter. When an inspection process for inspecting a defect of the printed matter is set, an inspection process on the image data to be inspected, which has been obtained by reading the printed matter, is performed based on a reference image, and when a character quality inspection process for inspecting a quality of a character of the printed matter is set, a character quality inspection process on the image data to be inspected, which has been obtained by a reading process of reading the printed matter, is performed based on the reference image. An adjustment is made to image data to be printed by a printing apparatus that generated the printed matter in accordance with an inspection result of the character quality inspection process on the image data which has been obtained by the reading process.

15 Claims, 14 Drawing Sheets

(56) References Cited

U.S. PATENT DOCUMENTS

| | | | | |
|---|---|---|---|---|
| 2018/0293732 | A1* | 10/2018 | Oki | G06T 7/001 |
| 2020/0009860 | A1* | 1/2020 | Kamada | G06T 7/11 |
| 2020/0409618 | A1* | 12/2020 | Nagai | G06F 3/1244 |
| 2022/0092758 | A1* | 3/2022 | Tashiro | H04N 1/00084 |

* cited by examiner

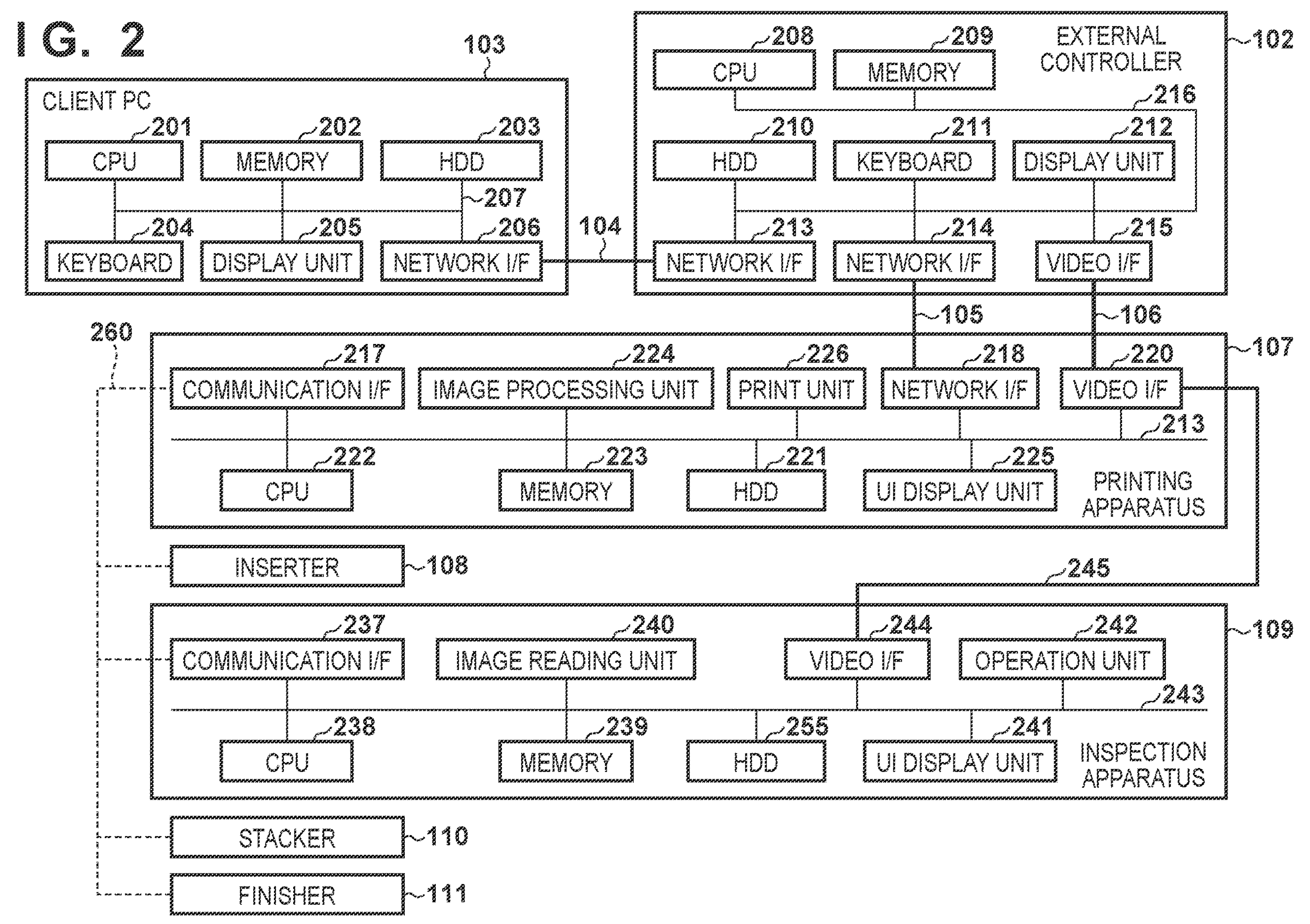
FIG. 2
103
CLIENT PC
201
CPU
202
MEMORY
203
HDD
207
204
KEYBOARD
205
DISPLAY UNIT
206
NETWORK I/F
104
EXTERNAL CONTROLLER
102
208
CPU
209
MEMORY
216
210
HDD
211
KEYBOARD
212
DISPLAY UNIT
213
NETWORK I/F
214
NETWORK I/F
215
VIDEO I/F
105
106
260
107
217
COMMUNICATION I/F
224
IMAGE PROCESSING UNIT
226
PRINT UNIT
218
NETWORK I/F
220
VIDEO I/F
213
222
CPU
223
MEMORY
221
HDD
225
UI DISPLAY UNIT
PRINTING APPARATUS
INSERTER
108
245
109
237
COMMUNICATION I/F
240
IMAGE READING UNIT
244
VIDEO I/F
242
OPERATION UNIT
243
238
CPU
239
MEMORY
255
HDD
241
UI DISPLAY UNIT
INSPECTION APPARATUS
STACKER
110
FINISHER
111

INSPECTION SETTING SCREEN

RESOLUTION 150 dpi

SETTINGS FOR NUMBER OF FEATURES

EXISTING SETTING VALUE: 3

USER SETTING: 10

OK CANCEL

```
%PDF-1.7

1 0 obj
<<
 /Type /Catalog
 /Pages 2 0 R
>>
endobj

2 0 obj
<<
 /Type /Pages
 /Kids [4 0 R]
 /Count 1
>>
endobj

3 0 obj
<<
 /Font <<
 /F0 <<
    /Type /Font
    /BaseFont/KozMinPro6N-Regular
    /Subtype /Type0
    /Encoding /90ms-RKSJ-H
    /DescendantFonts[6 0 R]
    >>
 >>
>>
endobj

4 0 obj
<<
 /Type /Page
 /Parent 2 0 R
 /Resources 3 0 R
 /MediaBox[0 0 595 842]
 /Contents 5 0 R
>>
endobj

50 obj
<< >>
stream
1. 0. 0. 1. 50. 770. cm
BT
/F0 5Tf
40 TL
<8fee> TjT*
ET
endstream
endobj

6 0 obj
<<
 /Type /Font
 /Subtype /CIDFontType0
 /BaseFont/KozMinPr6N-Regular
 /CIDSystemInfo<<
  /Registry (Adobe)
  /Ordering (Japan1)
  /Supplement 6
 >>
 /FontDescriptor 7 0 R
>>
endobj

7 0 obj
<<
 /Type /FontDescriptor
 /FontName/KozMinPr6N-Regular
 /Flags 4
 /FontBBox[-437 -340 1147 1317]
 /ItalicAngle 0
 /Ascent 1317
 /Descent -349
 /CapHeight742
 /StemV 80
>>
endobj

xref
trailer
<<
 /Size 8
 /Root 1 0 R
>>
startxref
0
%%EOF
```

701

702

FIG. 10A
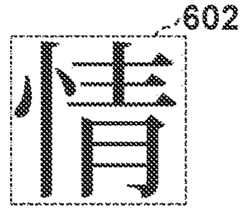
FIG. 10B
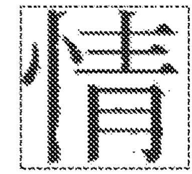
FIG. 10C
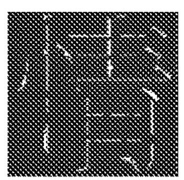
FIG. 10D
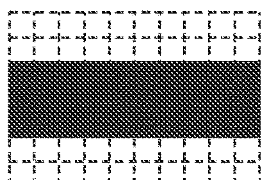
FIG. 10E
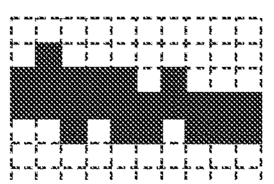
FIG. 10F
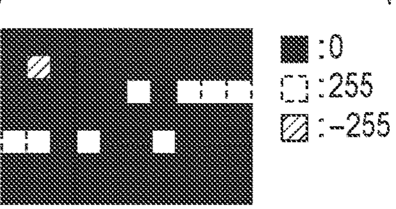
FIG. 11
| CHARACTER THICKENING LEVEL α | ADJUSTMENT LEVEL Lc |
|---|---|
| $0.3 < \alpha$ | −2 |
| $0.1 < \alpha \leq 0.3$ | −1 |
| $-0.1 \leq \alpha \leq 0.1$ | 0 |
| $-0.3 \leq \alpha < -0.1$ | +1 |
| $\alpha < -0.3$ | +2 |

FIG. 12A

ADJUSTMENT LEVEL: −2

FIG. 12B

ADJUSTMENT LEVEL: −1

FIG. 12C

ADJUSTMENT LEVEL: 0

FIG. 12D

ADJUSTMENT LEVEL: 1

FIG. 12E

ADJUSTMENT LEVEL: 2

F I G. 15
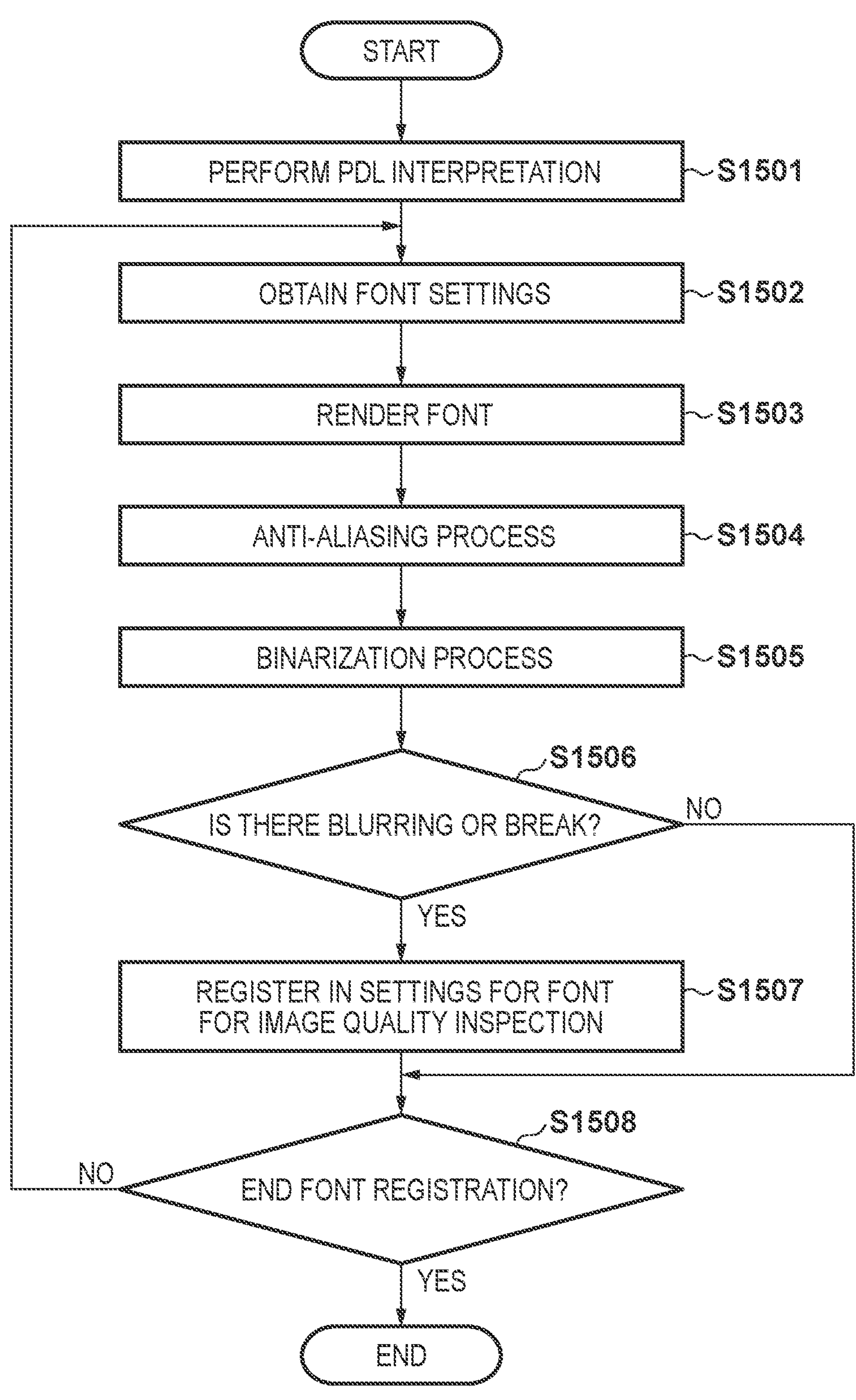

INSPECTION APPARATUS, METHOD OF CONTROLLING THE SAME, PRINTING SYSTEM, AND STORAGE MEDIUM

BACKGROUND OF THE INVENTION

Field of the Invention

The present invention relates to an inspection apparatus, a method of controlling the same, a printing system, and a storage medium.

Description of the Related Art

Conventionally, there have been inspection systems for determining whether there is any abnormality or defect in printed matter, which has been printed in a print bookbinding system. In addition, there are character quality automatic adjustment systems for inspecting image quality as to whether characters of printed matter, which has been printed in a print bookbinding system, is illegible and automatically adjusting the print bookbinding system according to a result of that inspection.

Japanese Patent Laid-Open No. 2013-101015 discloses an inspection apparatus for comparing a reference image for inspection and a scanned image, which has been obtained by reading printed matter, which has been outputted from a printing apparatus, with a reading apparatus, such as a scanner.

However, there is no description of inspection of quality of characters in printed matter or the like in the above-described conventional inspection apparatus. Therefore, when an inspection process for inspecting an abnormality or defect of printed matter and an inspection process for inspecting the quality of characters are to be performed, each of a first inspection apparatus for inspecting an abnormality or defect of printed matter and a second inspection apparatus for inspecting the quality of characters are necessary, thereby increasing the scale of the entire system. Further, in a case that such a first inspection apparatus and a second inspection apparatus are provided, since printed matter is read by a scanner of each of the first inspection apparatus and the second inspection apparatus, the control of the system is complicated.

SUMMARY OF THE INVENTION

Embodiments of the present disclosure eliminate the above-mentioned issues with conventional technology.

A feature of embodiments of the present disclosure is to solve the above problems by allowing execution of an inspection process for inspecting an abnormality or defect of printed matter and an inspection process for inspecting the quality of characters in a single inspection apparatus.

According to a first aspect of embodiments of the present disclosure, there is provided an inspection apparatus operable to inspect printed matter, the apparatus comprising: one or more controllers including one or more processors and one or more memories, the one or more controllers being configured to: obtain image data to be inspected by reading printed matter; in a case where an inspection process for inspecting a defect of the printed matter is set, perform an inspection process on the image data to be inspected, which has been obtained by reading the printed matter, based on a reference image; in a case where a character quality inspection process for inspecting a quality of a character of the printed matter is set, perform a character quality inspection process on the image data to be inspected, which has been obtained by reading the printed matter, based on the reference image; and make an instruction so as to adjust image data to be printed by a printing apparatus that generated the printed matter in accordance with an inspection result of the character quality inspection process.

According to a second aspect of embodiments of the present disclosure, there is provided a printing system including an information processing apparatus that transmits print data to the printing apparatus and causes a printing apparatus to print the print data, the printing apparatus that generates printed matter by executing printing based on the print data, and an inspection apparatus, the inspection apparatus comprising: one or more first controllers including one or more first processors and one or more first memories, the one or more first controllers being configured to: obtain image data to be inspected by reading printed matter; in a case where an inspection process for inspecting a defect of the printed matter is set, perform an inspection process on the image data to be inspected, which has been obtained by reading the printed matter, based on a reference image; in a case where a character quality inspection process for inspecting a quality of a character of the printed matter is set, perform a character quality inspection process on the image data to be inspected, which has been obtained by reading the printed matter, based on the reference image; and instruct so as to adjust image data to be printed by a printing apparatus that generated the printed matter in accordance with an inspection result of the character quality inspection process, and the printing apparatus or the information processing apparatus comprising: one or more second controllers including one or more second processors and one or more second memories, the one or more second controllers being configured to: transmit, to the inspection apparatus, image data to be the reference images generated from print data, wherein, in the instruction, the one or more first controllers are configured to make an instruction for the adjustment to the printing apparatus or the information processing apparatus.

According to a third aspect of embodiments of the present disclosure, there is provided an inspection apparatus operable to inspect printed matter that has been printed by a printing apparatus, the inspection apparatus comprising: one or more controllers including one or more processors and one or more memories, the one or more controllers being configured to: obtain image data to be inspected for which printed matter for which printing has been performed on a printing sheet based on reference image data has been read by the read unit; inspect whether there is a dot-shaped abnormality in the image data to be inspected based on the reference image data; and instruct so as to adjust a printing condition of the printing apparatus based on a difference between an object that has been extracted from the reference image data and an object that corresponds to the object and has been extracted from the image data to be inspected.

Further features of the present disclosure will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the disclosure and, together with the description, serve to explain the principles of the disclosure.

FIG. 2 is a block diagram for describing a hardware configuration of a printing apparatus, an external controller, an inspection apparatus, and a client PC of the printing system according to the first embodiment.

FIG. 5A is a diagram illustrating an example of a screen for settings for character quality inspection to be displayed on the display unit of the inspection apparatus according to the first embodiment.

FIG. 5B is a diagram illustrating an example of a screen for when the respective items of character quality inspection settings have been set to be automatic in a second embodiment.

FIG. 7 is a diagram illustrating an example of a PDF description of PDL data of the printed matter of FIG. 6.

FIGS. 10A to 10F are schematic diagrams for explaining quantification of character image quality.

FIG. 11 is a diagram illustrating an example of a table indicating a relationship between a character thickening level $\alpha$ and an adjustment level Lc.

FIGS. 12A to 12E are diagrams illustrating control for character quality adjustment by an image processing unit of the printing apparatus according to the first embodiment.

FIG. 15 is a flowchart for explaining a flow of a process for registering settings for a font for image quality inspection by the external controller of the printing system according to a third embodiment.

DESCRIPTION OF THE EMBODIMENTS

Embodiments of the present disclosure will be described hereinafter in detail, with reference to the accompanying drawings. It is to be understood that the following embodiments are not intended to limit the claims of the present disclosure, and that not all of the combinations of the aspects that are described according to the following embodiments are necessarily required with respect to the means to solve the issues according to the present disclosure.

First Embodiment

Figure 1:
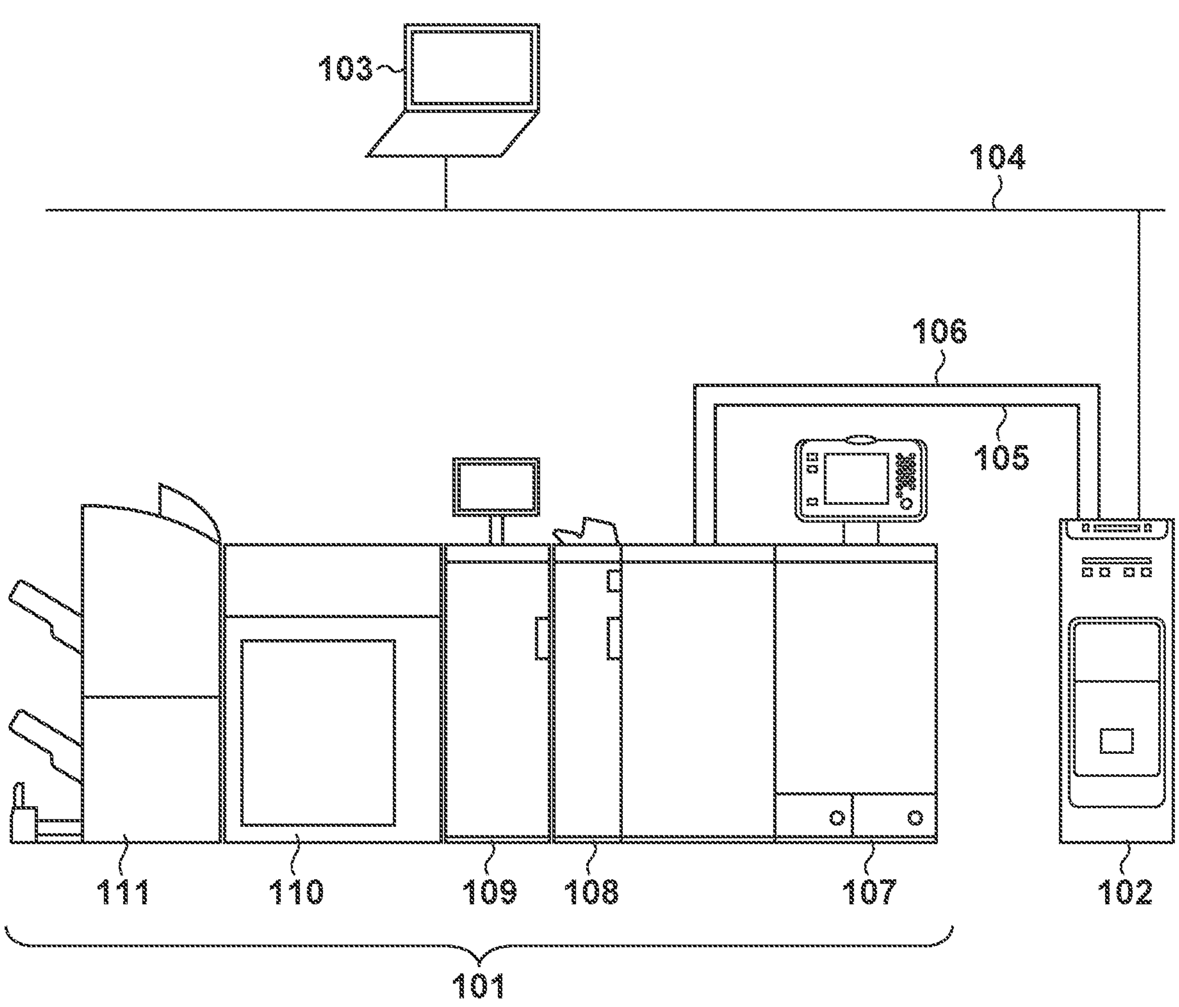
FIG. 1 is a diagram for describing an example of a network configuration including a printing system according to a first embodiment of the present invention.

FIG. 1 is a diagram for describing an example of a network configuration including a printing system 101 according to a first embodiment of the present invention.

The printing system 101 is connected to an external controller 102 (information processing apparatus). The printing system 101 and the external controller 102 constitute an image processing system. The printing system 101 may be referred to, for example, as an image forming apparatus or a multi-functional peripheral (MFP). The printing system 101 and the external controller 102 are connected via an internal LAN 105 and a video cable 106 so as to be capable of communication. The external controller 102 is connected with a client PC 103 via an external LAN 104 so as to be capable of communication. The external controller 102 may be referred to, for example, as an image processing controller, a digital front-end (DFE), or a print server.

The client PC 103 can issue a print instruction to the external controller 102 via the external LAN 104. A printer driver is installed on the client PC 103. The printer driver has a function of converting print data into page description language (PDL) data that can be processed by the external controller 102. By operating the client PC 103, a user can issue a print instruction to the printing system 101 via the printer driver from various applications installed on the PC 103. The printer driver transmits print data, that is, PDL data, to the external controller 102 based on the print instruction from the user. Upon receiving the PDL data from the client PC 103, the external controller 102 analyzes and interprets the received PDL data. Then, the printing instruction is performed by a rasterization process being performed based on a result of the interpretation; bitmap image data having a resolution matching that of the printing system 101 being generated; and that bitmap image data being inputted to the printing system 101. The resolution is usually 600 dpi, and for high-definition cases, the resolution is 1200 dpi for many of the printing systems. In the following, a description will be given using an example in which the resolution is 600 dpi.

The printing system 101 includes a plurality of apparatuses each having a different function and is configured to be able to execute various processes, such as a bookbinding process. In the first embodiment, the printing system 101 includes a printing apparatus 107, an inserter 108, an inspection apparatus 109, a large capacity stacker 110, and a finisher 111. A sheet on which an image has been printed by the printing apparatus 107, and that has been discharged from the printing apparatus 107 is conveyed inside each apparatus in the order of the inserter 108, the inspection apparatus 109, the large capacity stacker 110, and the finisher 111. Although in the first embodiment the printing system 101 is an example of an image forming apparatus, the printing apparatus 107 included in the printing system 101 may be referred to as an image forming apparatus or a multi-functional peripheral. The inspection apparatus 109 not only inspects whether or not printed matter is dirty, colors are misregistered, the printing position is shifted, and the like but also inspects the quality of characters including whether or not the characters on printed matter are blurred or defaced, and the like and can perform a character quality adjustment function, which will be described later, according to a result thereof.

The printing apparatus 107 forms (prints) an image on a sheet, which has been fed and conveyed from a sheet feeding unit disposed at a lower portion of the printing apparatus 107, using toner (developer). The inserter 108 inserts a sheet into a series of sheets that are conveyed from the printing apparatus 107. The inspection apparatus 109 includes a printed matter inspection function and a character quality adjustment function. The inspection function is a function of inspecting a sheet which has been conveyed through a conveyance path after an image has been printed by the printing apparatus 107. More specifically, the inspection function is a function of inspecting an image that has been printed on a conveyed sheet (determining whether an image is normal) by reading the image that has been printed on the conveyed sheet and comparing the obtained image data with a reference image that has been registered in advance.

Meanwhile, the character quality adjustment function is a function of adjusting image quality such that the reproducibility of characters on a sheet, which has been conveyed through a conveyance path after an image has been printed by the printing apparatus 107, is more appropriate. More specifically, the character quality adjustment function includes an inspection function and an adjustment function. The inspection function reads an image that has been printed on a conveyed sheet and compares image data that has been obtained by reading with a reference image, which is bitmap image data that has been obtained by rasterizing PDL data. By this comparison, the reproducibility of characters that have been printed on the sheet is inspected (blurring, defacement, and the like of characters of the image are determined). As a result of this inspection, if blurring, defacement, and the like of characters are found, the printing apparatus 107 is instructed to adjust image processing settings and other process settings such that the image quality of reproducibility of characters becomes more appropriate. The large capacity stacker 110 is an apparatus that is capable of stacking a large number of sheets. The finisher 111 is an apparatus that is capable of performing a finishing process, such as a stapling process, a punching process, and a saddle stitching bookbinding process on conveyed sheets. The sheets that have been processed by the finisher 111 are discharged to a predetermined discharge tray.

FIG. 2 is a block diagram for describing a hardware configuration of the printing apparatus 107, the external controller 102, the inspection apparatus 109, and the client PC 103 of the printing system 101 according to the first embodiment.

The printing apparatus 107 includes a communication interface (I/F) 217, a network I/F 218, a video I/F 220, an HDD 221, a CPU 222, a memory 223, and a UI display unit 225. The printing apparatus 107 further includes an image processing unit 224, and a print unit (printer engine) 226. They are each connected to each other via a system bus 213.

The communication I/F 217 is connected via a communication cable 260 to the inserter 108, the inspection apparatus 109, the large capacity stacker 110 and the finisher 111. The CPU 222 communicates with each apparatus via the communication I/F 217. The network I/F 218 is connected to the external controller 102 via the internal LAN 105 and is used for communicating control data and the like. The video I/F 220 is connected to the external controller 102 via the video cable 106 and is used for communicating data, such as image data. The video I/F 220 is also connected to a video I/F 244 of the inspection apparatus 109 via a video cable 245. The printing apparatus 107 (the printing system 101) and the external controller 102 may be connected only by the video cable 106 so long as the operation of the printing system 101 can be controlled by the external controller 102.

Various programs or data are stored in the HDD 221. The CPU 222 controls the operation of the printing apparatus 107 by deploying in the memory 223 a program stored in the HDD 221 and executing the program. The memory 223 stores programs and data necessary when the CPU 222 performs various processes. The memory 223 operates as a work area of the CPU 222. The UI display unit 225 receives input for various settings from the user and operation instructions and is used for displaying various kinds of information, such as setting information and a processing status of a print job.

The image processing unit 224 converts bitmap image data, which is generated by the external controller 102, into image data that is optimal for the printing system. For example, for color data, a color conversion process for optimally converting colors is performed, and for characters, a character quality adjustment process (fine line thickness adjustment process) for converting a fine line portion to an optimal thickness is performed. More specifically, if a black fine line portion of a character is blurred in a given printing system, a character quality adjustment process (fine line thickness adjustment process) for thickening a black fine line is performed in advance to print appropriate black fine lines. In addition, if a white fine line portion that is surrounded by a black fine line is defaced, a character quality adjustment process (fine line thickness adjustment process) for thinning a black fine line is performed in advance to print appropriate black fine lines. Details of the character quality adjustment process will be described later.

The print unit 226 forms (prints) an image on a sheet, which has been fed and conveyed from a sheet feeding unit disposed at a lower portion of the printing apparatus 107, using toner (developer) based on print data that has been converted into a bitmap that is optimal for printing by the image processing unit 224.

The inserter 108 feeds a sheet to be inserted from a sheet feeding unit of the inserter 108 or controls conveyance of a sheet conveyed from the printing apparatus 107.

The inspection apparatus 109 includes a communication I/F 237, a CPU 238, a memory 239, an image reading unit 240, a display unit 241, an operation unit 242, an HDD 255, and the video I/F 244. These devices are each connected to each other via a system bus 243. The communication I/F 237 is connected to the printing apparatus 107 via the communication cable 260. The CPU 238 performs communication, which is necessary for controlling the inspection apparatus 109, via the communication I/F 237. The CPU 238 controls the operation of the inspection apparatus 109 by executing a control program stored in the memory 239. The memory 239 stores the control program for the inspection apparatus 109.

An image reading unit 240 reads a conveyed sheet according to an instruction of the CPU 238. The CPU 238 stores image data that has been obtained by reading an image of the sheet by the image reading unit 240 in the memory 239 as a reference image for inspection. The CPU 238 further compares image data to be inspected, which has been read by the image reading unit 240, with the reference image stored in the memory 239 and performs an inspection process for inspecting an image printed on a sheet based on that comparison result. In addition, the reproducibility of characters that are printed on the sheet is inspected by comparing a reference image for characters, which is bitmap image data for which PDL data has been rasterized, with the image data to be inspected, which has been used in the above-mentioned inspection process. Then, a character quality adjustment process for obtaining an adjustment amount of a character is performed based on a result of that inspection. The adjustment amount of character quality that has been obtained here is transmitted to the printing apparatus 107 and is set for a fine line thickness adjustment process of the image processing unit 224, and fine lines are printed at optimal thicknesses. Although the image data that has been obtained by the image reading unit 240 has been used as the reference image for the inspection process, bitmap image data for which PDL data has been rasterized may be used similarly to the reference image for the inspection of character quality.

The display unit 241 is used for displaying an inspection process result, a character quality adjustment result, a setting screen, and the like. The operation unit 242 is operated by the user and receives various instructions (e.g., a setting change of the inspection apparatus 109, an instruction for registering a reference image for an inspection process, designation of a character type and size to be inspected, and the like) from the user. The HDD 255 stores various kinds of setting information and image data that are necessary for an inspection process, a character quality inspection process, and character quality adjustment. Various kinds of setting information and image data that are stored in the HDD 255 can be reused. The video I/F 244 is connected to the video I/F 220 of the printing apparatus 107 via the video cable 245 and is used for transmitting and receiving image data (print data).

The stacker 110 performs control for either discharging to a stack tray, discharging to an escape tray, or conveying to the finisher 111, which is connected downstream in a conveyance direction of a sheet, a sheet that has been conveyed through a conveyance path.

The finisher 111 controls conveyance and discharge of sheets and performs a finishing process, such as stapling, punching, or saddle stitching bookbinding.

The external controller 102 includes a CPU 208, a memory 209, an HDD 210, a keyboard 211, a display unit 212, network I/Fs 213 and 214, and a video I/F 215. These devices are each connected to each other via a system bus 216. The CPU 208 controls the operation of the external controller 102 by deploying in the memory 209 a program stored in the HDD 210 and executing the program. For example, reception of PDL data from the client PC 103, a RIP process for rasterizing PDL data, a process for transmitting print data to the printing system 101, and the like are performed. The memory 209 stores programs and data to be necessary when the CPU 208 performs various processes. The memory 209 operates as a work area of the CPU 208.

Various programs and data are stored in the HDD 210. The keyboard 211 is used for input of an instruction for operating the external controller 102 from the user. The display unit 212 is used for displaying, for example, information of an application that is being executed in the external controller 102, an operation screen, and the like. The network I/F 213 is connected to the client PC 103 via the external LAN 104 and is used for communicating data, such as a print instruction. The network I/F 214 is connected to the printing apparatus 107 via the internal LAN 105 and is used for communicating data, such as a print instruction. The video I/F 215 is connected to the printing apparatus 107 via the video cable 106 and is used for communicating data, such as image data (print data).

The client PC 103 includes a CPU 201, a memory 202, an HDD 203, a keyboard 204, a display unit 205, and a network I/F 206. These devices are each connected to each other via a system bus 207. The CPU 201 controls the operation of each device via the system bus 207 by deploying in the memory 202 a program stored in the HDD 203 and executing the program. As a result, various processes are realized by the client PC 103. For example, the CPU 201 generates print data and issues a print instruction by deploying in the memory 202 a document processing program stored in the HDD 203 and executing the program. The memory 202 stores programs and data necessary when the CPU 201 performs various processes. The memory 202 operates as a work area of the CPU 201.

The HDD 203 stores programs, such as various applications (e.g., a document processing program) and a printer driver, and various kinds of data. The keyboard 204 is used for input of an instruction for operating the client PC 103 from the user. The display unit 205 is used for displaying, for example, information of an application that is being executed in the client PC 103, an operation screen, and the like. The network I/F 206 is connected with the external controller 102 via the external LAN 104 so as to be capable of communication. The CPU 201 communicates with the external controller 102 via the network I/F 206.

Although in the system configuration of FIG. 1 the external controller 102 is connected to the printing system 101, the present invention can also be applied to a configuration that is different from this. For example, a configuration may be taken such that the printing system 101 is connected to the external LAN 104 and print data is transmitted from the client PC 103 to the printing system 101 without going through the external controller 102. In this case, data analysis, interpretation, and rasterization for print data are performed by the printing system 101.

Figure 3:
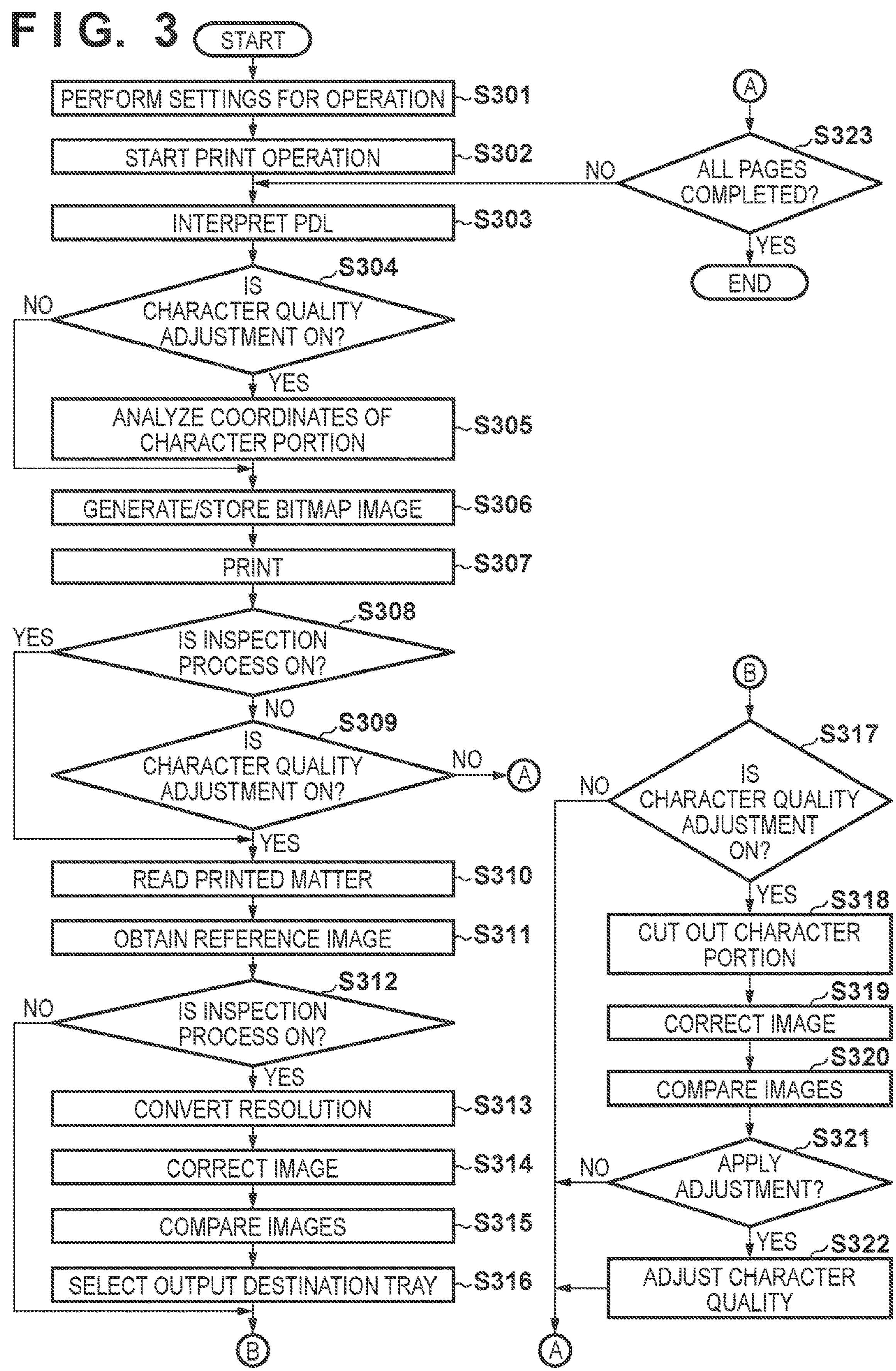
FIG. 3 is a flowchart for explaining a flow of a process in the printing system according to the first embodiment.

FIG. 3 is a flowchart for explaining a flow of a process in the printing system 101 according to the embodiment. In this flowchart, a process of the inspection apparatus 109 is realized by the CPU 238 executing a program that has been deployed in the memory 239, and a process of the external controller 102 is realized by the CPU 208 executing a program that has been deployed in the memory 209.

Figures 4A, 4B:
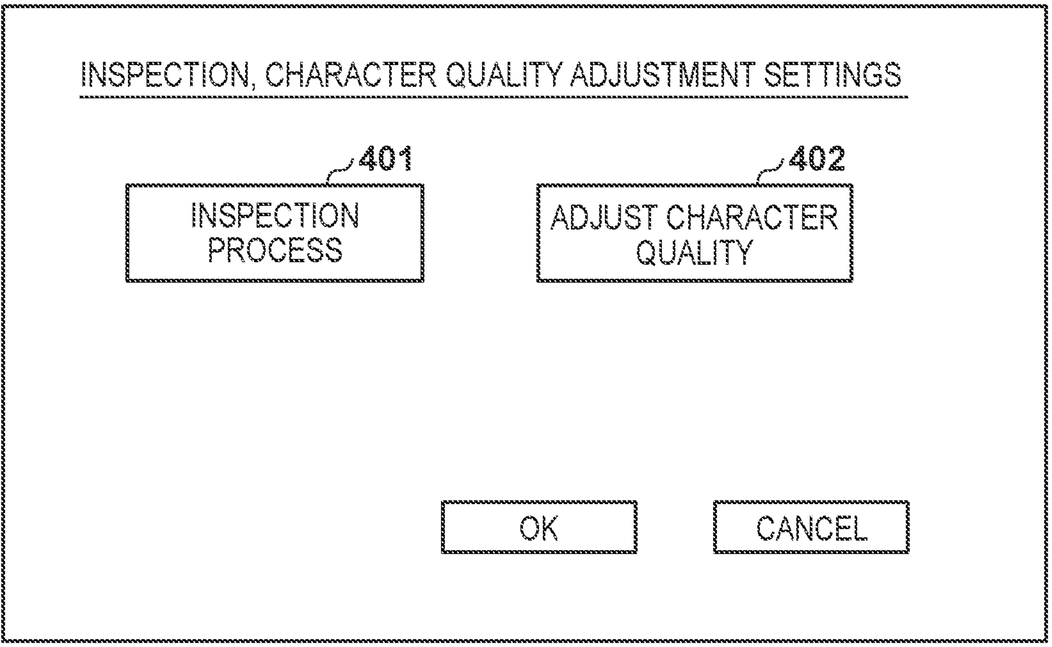
FIG. 4A is a diagram illustrating an example of a screen for settings for an inspection process and character quality automatic adjustment to be displayed on a display unit of the inspection apparatus according to the first embodiment.
FIG. 4B is a diagram illustrating an example of a screen for performing various settings of the inspection process when the inspection process is selected.

First, in step S301, the CPU 238 of the inspection apparatus 109 displays a screen for settings for inspection and character quality adjustment, which is illustrated in FIG. 4A, on the display unit 241, and the user sets any of the inspection process and character quality automatic adjustment to execute.

FIG. 4A is a diagram illustrating an example of a screen for settings for an inspection process and character quality automatic adjustment to be displayed on the display unit 241 of the inspection apparatus 109 according to the first embodiment.

When an inspection process 401 indicating the inspection process is set to on, the CPU 238 displays an inspection setting screen, which is illustrated in FIG. 4B, on the display unit 241 and prompts the user to perform settings for the inspection process for inspecting an abnormality in printed matter.

FIG. 4B is a diagram illustrating an example of a screen for performing various kinds of settings for the inspection process to be displayed on the display unit 241 of the inspection apparatus 109 according to the first embodiment. Here, the resolution (here, 150 dpi) and the number of feature points can be set.

Figures 5A, 5B:
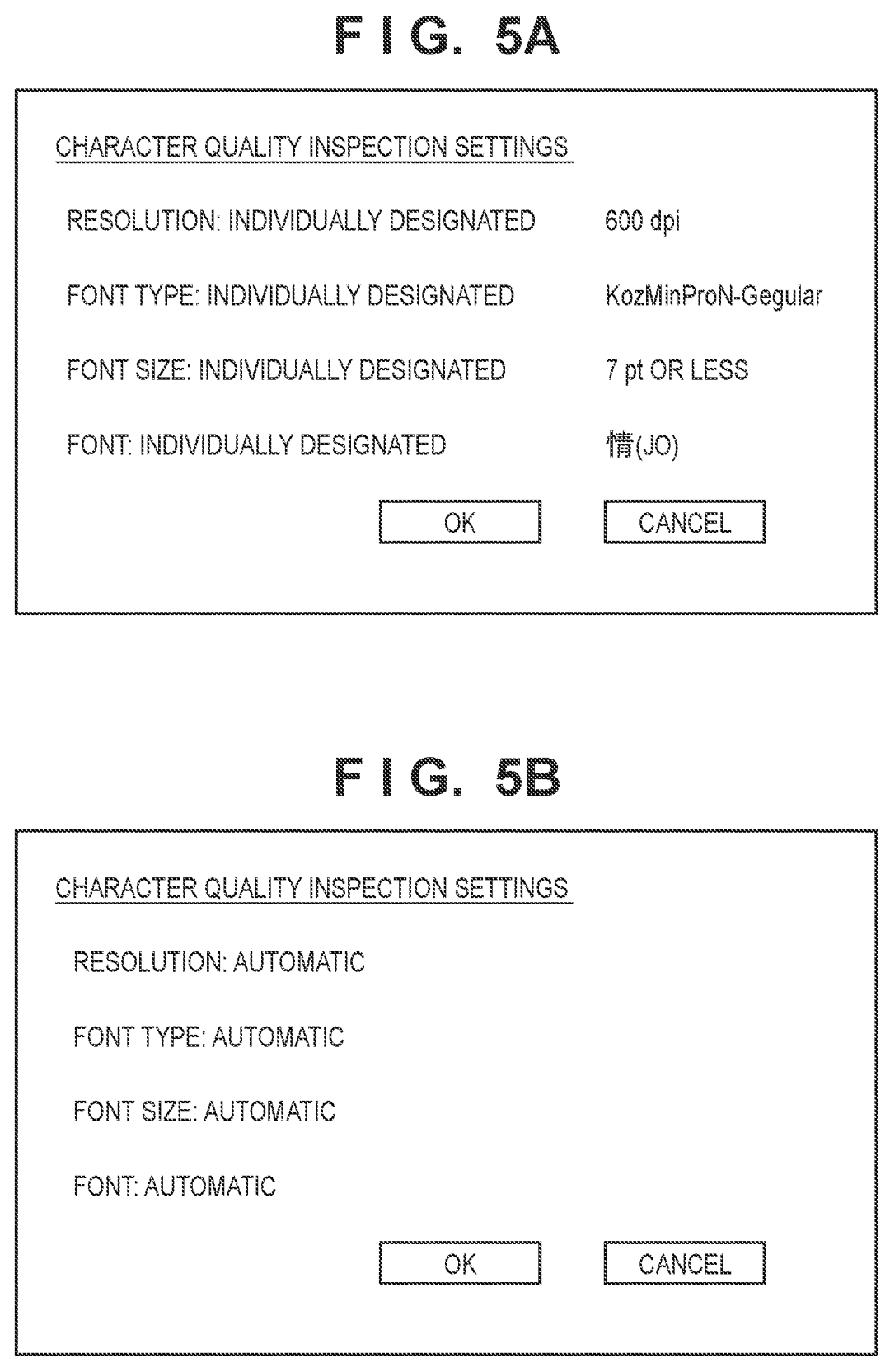

Meanwhile, if character quality adjustment 402 is set to on in the screen of the FIG. 4A, the CPU 238 displays a screen for settings for character quality inspection of FIG. 5A on the display unit 241 and prompts the user to perform settings for character quality inspection.

FIG. 5A is a diagram illustrating an example of a screen for settings for character quality inspection to be displayed on the display unit 241 of the inspection apparatus 109 according to the first embodiment. Here, the resolution (here, 600 dpi), font type, font size (here, 7 points or less), and font (character designation; here, a kanji character "情 (jo)") are included.

The contents set in step S301 are stored in the memory 239 of the inspection apparatus 109 and are transmitted to the external controller 102 via the printing apparatus 107 and stored in the memory 209 of the external controller 102.

Figure 8:
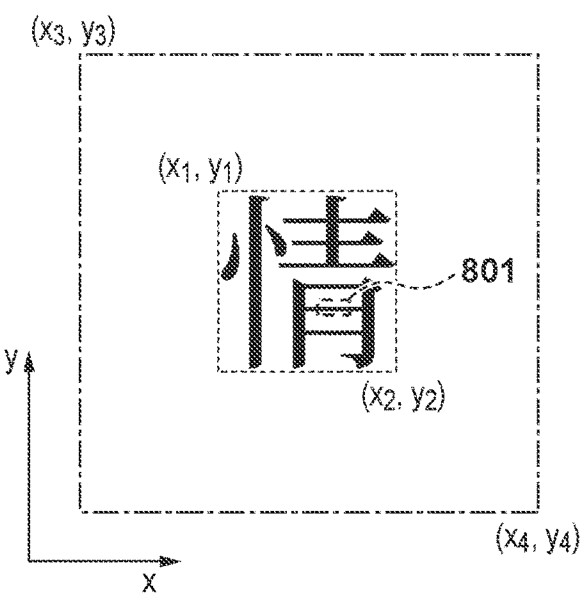
FIG. 8 is a diagram illustrating an example of an image for which a character portion has been cut out from a reference image.

Next, the process proceeds to step S302, and the PC 103 and the external controller 102 issues a print instruction for starting a print operation. Here, in order to simplify the explanation, it is assumed that PDL data is portable document format (PDF) data for printing one kanji character ("情 (jo)") on one page as illustrated in FIG. 8, for example, and the following description is given using an example in which a direct print instruction has been performed to the external controller 102 for this PDF data.

Next, in step S303, the CPU 208 of the external controller 102 performs PDL interpretation for generating a bitmap image for printing, including such as a character font type, size, and character rendering designation position, based on the above-mentioned PDF file.

Next, the process proceeds to step S304, and the CPU 208 of the external controller 102 determines whether the character quality adjustment 402 has been set to on in step S301. Here, if the character quality adjustment 402 has been set to on, the process proceeds to step S305; otherwise, the process skips step S305 and proceeds to step S306. In step S305, the CPU 208 analyzes coordinates of a character portion based on an analysis result of the PDL analyzed in step S303 and the character quality inspection settings of FIG. 5A and obtains the coordinates of the character portion for cutting out a character image for character quality inspection from the image data for printing. Details on the analysis of coordinates of the character portion will be described later.

Next, the process proceeds to step S306, and the CPU 208 performs rasterization into bitmap image data that accords with the resolution of the print instruction. Here, as an example, the resolution is 600 dpi. The CPU 208 then transmits the rasterized bitmap image data to the printing apparatus 107 as image data for printing and temporarily stores the bitmap image data as a reference image in the HDD 210 of the external controller 102. The process proceeds to step S307, and the CPU 208 of the external controller 102 transfers the bitmap image data stored in the HDD 210 of the external controller 102 to the printing apparatus 107 to be printed. Image processing is performed on the transferred bitmap image data by the image processing unit 224 under the control of the CPU 222 of the printing apparatus 107, and the bitmap image data is then printed by the print unit 226.

Next, the process proceeds to step S308, and the CPU 238 of the inspection apparatus 109 determines whether the inspection process 401 has been set to on in step S301. If the inspection process 401 has been set to on, the process proceeds to step S310; otherwise, the process proceeds to step S309. In step S309, the CPU 238 determines whether the character quality adjustment 402 has been set to on in step S301. If the character quality adjustment 402 has been set to on, the process proceeds to step S310, and if the character quality adjustment 402 has not been set to on, the process proceeds to step S323 as there is no need to inspect the printed matter.

In step S310, the CPU 238 of the inspection apparatus 109 reads the printed matter, which has been printed in step S307, by the image reading unit 240 and temporarily stores image data, which has been obtained by the reading, in the HDD 255 as image data to be inspected in either or both of the inspection process and the character quality inspection. At this time, regarding the resolution for when the image reading unit 240 reads the printed matter, which has been printed in step S307, the reading is performed at the resolution that has been designated by the settings for character quality inspection of FIG. 5A or at the highest resolution at which the image reading unit 240 can perform the reading, so that detailed portions of the character can be read. Here, a description will be given assuming that the reading is performed at the resolution (600 dpi) that has been designated in the settings for character quality inspection of FIG. 5A.

Next, the process proceeds to step S311, and the CPU 238 of the inspection apparatus 109 obtains the bitmap image data, which has been used at the time of printing, from the printing apparatus 107 via the video cable 245 and stores the image data in the HDD 255 as a reference image for either or both of the inspection process and the character quality inspection.

Next, the process proceeds to step S312, and the CPU 238 of the inspection apparatus 109 determines whether the inspection process 401 has been set to on in step S301. If the inspection process 401 has been set to on, the process proceeds to step S313; otherwise, the process proceeds to step S317. In step S313, the CPU 238 performs resolution conversion in which the 600-dpi image data to be inspected, which has been obtained in step S310, and the 600-dpi reference image, which has been obtained in step S311, are lowered to 150 dpi, which is the resolution for the inspection process of FIG. 4B. Here, the resolution is reduced from 600 dpi to 150 dpi in order to perform determination of the inspection process within a printing speed. If the CPU 238 is high speed and the inspection process can be executed within the printing speed at high resolution, this resolution conversion is unnecessary. Next, the process proceeds to step S314, and the CPU 238 aligns the image data to be inspected and the reference image and performs image correction (alignment) so that the images can be compared to each other as to whether there are things (dirt, debris, and the like) in the image data to be inspected that are not in the reference image. The purpose of this image correction is to allow comparison of the image data to be inspected with the reference image, which is not skewed or enlarged/reduced, by obtaining a correction value for skewness and enlargement/reduction since image data to be inspected, which has been obtained by reading the printed matter, is skewed or enlarged/reduced to a certain degree due to the conveyability of paper and the like. Then, the process proceeds to step S315, and the CPU 238 performs the inspection process as to whether there is dirt, debris, or the like by comparing the image data to be inspected on which image correction has been performed in step S314 with the reference image and obtains an inspection result for each page. Then, the process proceeds to step S316, and the CPU 238 performs control so as to send printed matter for which the inspection is OK to the finisher 111 and selects an output destination tray so as to discharge printed matter, which has been determined NG in the inspection, to a purge tray of the stacker 110 based on a determination result of the inspection process and then advances to step S317.

In step S317, the CPU 238 determines whether the character quality adjustment 402 has been set to on. If the character quality adjustment 402 has been set to on, the process proceeds to step S318; otherwise, the process proceeds to step S323. In step S318, the CPU 238 cuts out a character portion from each of the image data to be inspected and the reference image, which are stored in the HDD 255, based on the coordinates of the character portion, which has been obtained in step S305. Although the resolution conversion is performed in the inspection process described above, the resolution conversion is not performed because the character is processed at a high resolution in the character quality inspection process. Since the character is present only on a portion of the page and is small in size, even if the resolution is high, it has little effect on processing speed.

Figure 9A:
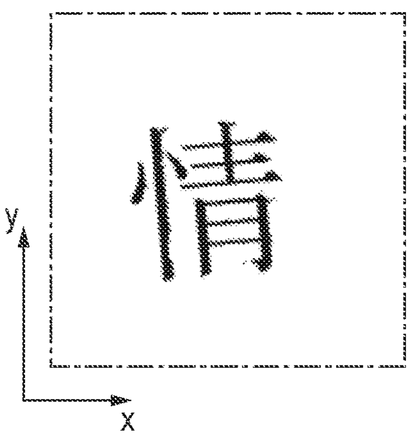
FIG. 9A is a diagram illustrating an example of an image for which a character portion has been cut out from target image data.

FIG. 8 is a diagram illustrating an example of an image for which a character portion has been cut out from a reference image. In addition, FIG. 9A illustrates an example of an image for which a character portion has been cut out from an image to be inspected. Since the reference image is not skewed due to it being a rendered image, the cut-out is performed at a character rendering designation position. In contrast, the image data to be inspected is often skewed as in FIG. 9A due to reading of printed matter. Therefore, for the image data to be inspected, a range that is larger than the character rendering designation position is cut out. Details on cutting out a character will be described in analysis of coordinates of a character portion.

Figure 9B:
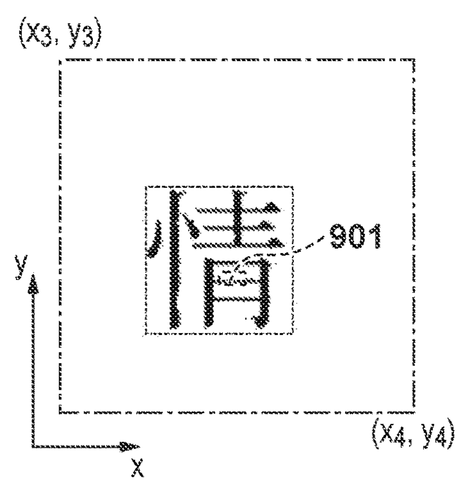
FIG. 9B is a diagram of an example of an image, which has been obtained by correcting the cut-out character portion.

Next, the process proceeds to step S319, and the CPU 238 aligns the image data to be inspected and the reference image. In this case, image correction (alignment) is performed so as allow comparison with the reference image to ascertain whether there is thickening or thinning of a character in the image data to be inspected. FIG. 9B illustrates an example of an image for which a character portion that has been cut out from the image data to be inspected has been corrected. This is a diagram illustrating an example in which the rotation of the character as illustrated in FIG. 9A has been corrected.

Next, the process proceeds to step S320, and the CPU 238 performs character quality inspection, such as determining whether the lines of the character are thick or thin, by comparing the image data to be inspected on which image correction has been performed in step S319, with the reference image and obtains for each page a character thickening level $\alpha$ indicating the thickening or thinning of lines as an inspection result. Details on this inspection will be described later in control for character adjustment.

Next, the process proceeds to step S321, and the CPU 238 determines whether to apply the inspection result of step S320 to the control for character quality adjustment of the image processing unit 224 of the printing apparatus 107. Here, since characters are small and variations in the print unit 226 is are included, a configuration is taken so as to be able to take an average of character thickening levels $\alpha$ of 100 pages and apply the average to character quality adjustment every 100 pages. That is, the CPU 238 determines whether the page is the 100th page, and if it is the 100th page, the CPU 238 determines to apply the adjustment and the processing proceeds to step S322; otherwise, the processing proceeds to step S323. Although it is assumed that the average of 100 pages is obtained here, it is advantageous to change the number of pages according to variations in the print unit 226. In addition, it is advantageous to make a change depending on the state of the job, such as in a case of a job of 100 pages or less, taking an average of the pages of the job and applying that average at the end. In step S322, the CPU 238 makes a setting to apply the inspection result to the control for character quality adjustment of the image processing unit 224 of the printing apparatus 107. Details on the control for character quality adjustment will be described later. In step S323, the CPU 238 determines whether the inspection process and the character quality inspection for all pages have been completed, and if they have been completed, the CPU 238 ends the process, and if they have not been completed, the CPU 238 proceeds to step S303 to process the next page.

A configuration may be taken so as to notify the external controller 102 of the inspection result in step S322 and adjust the print data in the external controller 102.

Next, a description will be given for details on analysis of coordinates of a character portion to be performed in the PDL interpretation process of step S303.

First, regarding the character for which the character portion coordinate analysis is to be performed, settings are performed on the screen for settings for character quality inspection of FIG. 5A in advance. FIG. 5A depicts a view illustrating an example of a screen for settings for character quality inspection, and it does not matter even if inspection is performed for not one but all the characters that are used in a page and then correction is performed based on a result of that inspection. In FIG. 5A, the resolution is set to 600 dpi, the font size is 7 points or less, and the character font is set to the kanji character “ "擾(jo)” whose font type is KozMinProN-Gegular.

Figure 6:
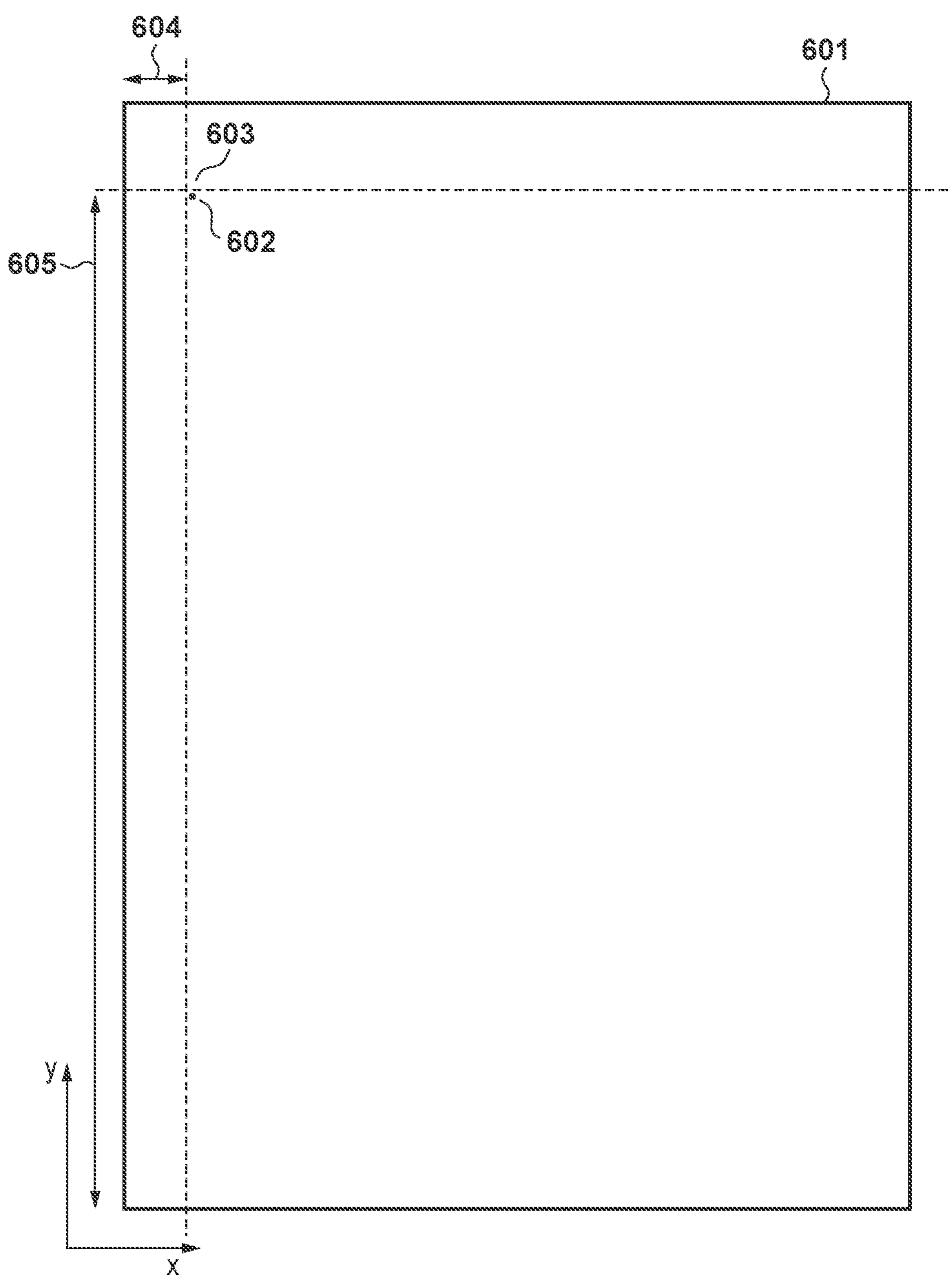
FIG. 6 is a diagram illustrating an example of print data that has been printed on a sheet (printed matter) according to the settings in the first embodiment.

FIG. 6 is a diagram illustrating an example of print data that has been printed on a sheet 601 (printed matter) according to the above-mentioned settings in the first embodiment. Here, only one character, the kanji character “ "擾(jo)”, is printed.

In the figure, reference numeral 602 denotes the printed kanji character “ "擾(jo)”, and a left margin 604 of the kanji character 602 is 50 points, which corresponds to 416 pixels, and a length 605 from the bottom is 720 points, which corresponds to 6000 pixels. Accordingly, the upper left coordinates (x1, y1) of the kanji character 602 is (416, 6000). The size of the character is 5 points and is therefore 41 pixels wide, and so, the lower right coordinates (X2, Y2) are (457, 6041). Since the image to be inspected may be skewed, the margin of 30 pixels is provided as illustrated in FIG. 8, and so, the cut-out range of the character is (x3, y3)=(386, 6030) and (x4, y4)=(487, 6071). Regarding this margin, a value that accords with the capabilities of the printer need only be used, and the margin of 30 is an example.

FIG. 8 depicts an enlarged view of the cut-out range of the character.

Here, illustration is made using an example in which print data of the kanji character “ "擾(jo)” for which the font size of 5 points and the font of KozMinPr6N-Regular have been designated has been printed. FIG. 7 is a diagram illustrating an example of a PDF description of PDL data of the printed matter of FIG. 6. In the following, analysis for coordinates of the character will be described with reference to FIG. 6 to FIGS. 9A and 9B and FIG. 13.

Figure 13:
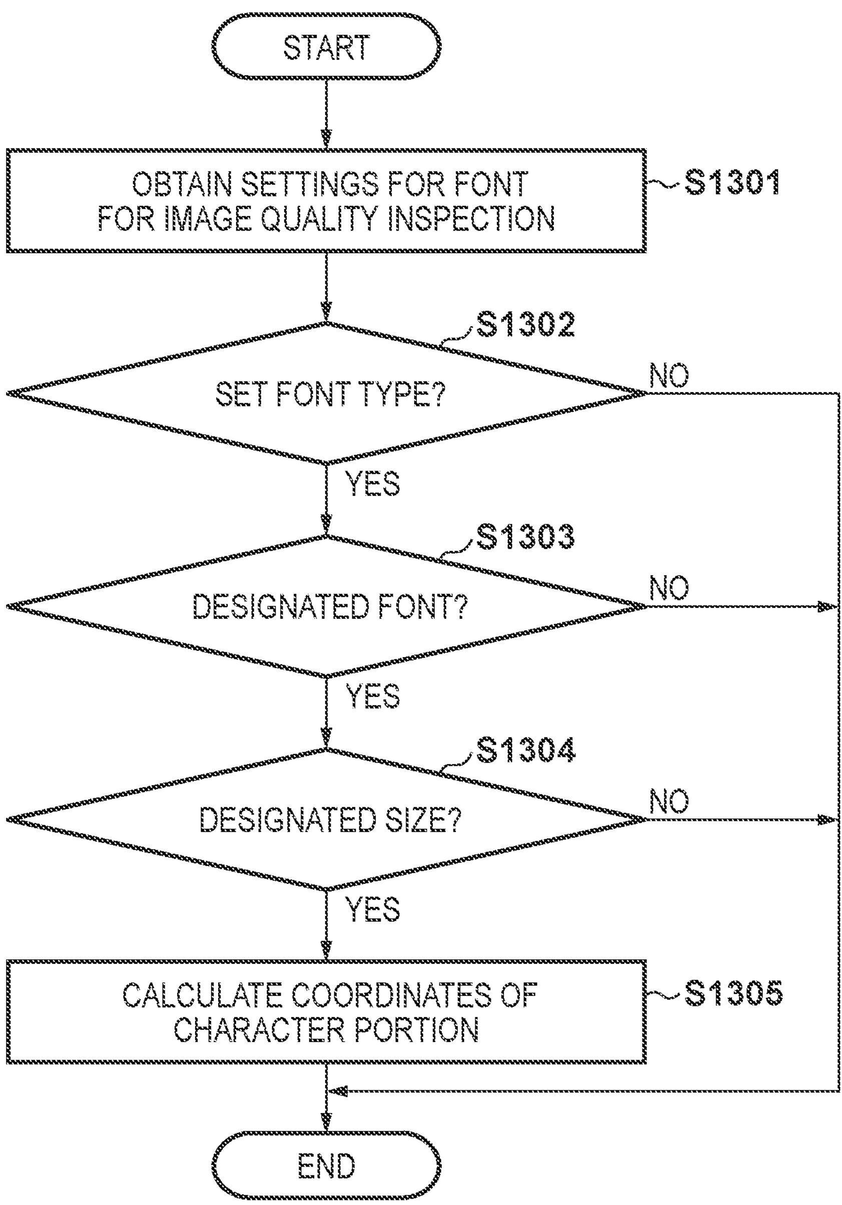
FIG. 13 is a flowchart for explaining a process for analyzing coordinates of a character portion to be executed by an external controller according to the first embodiment.

FIG. 13 is a flowchart for explaining a process for analyzing coordinates of a character portion to be executed by the external controller 102 according to the first embodiment. The process described in this flowchart is achieved by the CPU 208 of the external controller 102 executing a program that has been deployed in the memory 209.

First, in step S1301, the CPU 208 obtains settings for the font type, font size, and font to be used for character quality inspection, which have been set in advance in the screen for settings for character quality inspection of FIG. 5A. Here, a description will be given using as an example a case where the font is the kanji character “ "譲(jo)” (character code 8fee), the font size is 7 points (pt) or less, and the font type is KozMinPr6N-Regular. This is an example, and the present invention is not limited to this so long as the font allows inspection for character quality adjustment. In character quality inspection, it is desirable that the character to be inspected includes a portion of a thin line width and a portion for which it can be determined whether the line width is thick or thin upon comparison with the reference image.

Next, the process proceeds to step S1302, and the CPU 208 determines whether a /Type/Font description is the set font type “KozMinPr6N-Regular” in a font type designation portion 701 of the PDL data indicated in FIG. 7. Here, if the font type is the set font type, the process proceeds to step S1303; otherwise, the process ends. Here, since KozMinPr6N-Regular is described, the process proceeds to step S1303.

In step S1303, the CPU 208 determines whether or not the font code “8fee” corresponding to the set kanji character “ "譲(jo)” is used in a /F0 description in a font designation portion 702 of the PDL data illustrated in FIG. 7. If the designated font code is described, the process proceeds to step S1304; otherwise the process ends. Here, the font code “8fee” is used, so the process proceeds to step S1304. In step S1304, the CPU 208 determines whether or not the font designation portion 702 of the PDL data indicated in FIG. 7 uses the set font of 7 pt or less as described in /F0. If the set font of 7 pt or less is used, the process proceeds to step S1305; otherwise the process ends. Here, since 5 pt, which is 7 or less, is used in the font designation portion 702, the process proceeds to step S1305. In step S1305, the CPU 208 obtains the upper left coordinates (x1, y1) of the rectangle of the character from a description “1.0.0.1.50.770.cm” of the font designation portion 702 of the PDL data of FIG. 7. Regarding these numerals, “1.0.0.1.” indicates a square matrix and that there is no rotation. Then, “50.770.” shows a translation of 50 points to the right and 720 points upward. That is, in 600 dpi, the left margin 604 is 416 pixels at 50 points, the vertical length is 6000 pixels at 720 points, and so, the upper left coordinate (x1, y1) of the kanji character 602 is (416, 6000). Here, the size of the kanji character 602 is 5 points and is therefore 41 pixels wide, and so, the lower right coordinates (x2, y2) of the kanji character 602 are (457, 6041). Since the image to be inspected may be skewed, 30 pixels' worth of margin is provided, and so, the cut-out range of the character is (x3, y3)=(386, 6030) and (x4, y4)=(487, 6071).

Next, a description will be given for details on quantification of a character and details on image processing for character quality adjustment.

The CPU 238 quantifies character quality. First, difference data of the reference image and the image to be inspected, which have been aligned in step S319, is generated. Specifically, a difference value of pixel values is calculated for each pixel at the same position of the reference image and the image to be inspected. The difference is calculated by the following formula.

difference value=(pixel value of character of image to be inspected)−(pixel value of character of reference image)

FIGS. 10A to 10F are schematic diagrams for explaining quantification of character image quality.

FIG. 10D is a diagram in which a portion 801 of the reference character image of FIG. 8 has been enlarged, and FIG. 10E is a diagram in which a portion 901 of the inspection character image of FIG. 9B has been enlarged. Pure black pixels indicate the character portion. Here, in order to simplify the explanation, binarized images (pure white 255, pure black 0) are used, but a color image in which each RGB color is 8 bits may be used as is.

FIG. 10F is difference data, which has been obtained from FIG. 10D and FIG. 10E. Pure black pixels are a difference value 0, pure white pixels are a difference value 255, and a diagonally hatched pixel is a difference value “−255”.

Next, an amount by which the character of the printed matter has thickened is calculated based on this difference data. First, a number of pixels N1 for which a negative difference value is less than a predetermined negative threshold (th1) in the difference data is calculated. Next, a number of pixels N2 for which a positive difference value is greater than a predetermined positive threshold (th2) is calculated. Then, the character thickening level α is calculated from a ratio of a difference (N1−N2) between the numbers of pixels N1 and N2 with respect to the number of pixels of the character portion of the image to be inspected.

$$\alpha=(N1-N2)/(\text{the number of pixels of the character portion of the image to be inspected})$$

For example, in a case of the difference data illustrated in FIG. 10F, when both th1 and th2 are 0 for simplicity, N1 is 1 and N2 is 8. Therefore, a value of the character thickening level α of FIG. 10E can be obtained as follows using the above-mentioned calculation equation:

$$\alpha=(1-8)/30\approx-0.23$$

Although a portion of the character is used here for the sake of descriptive convenience, in practice, the same calculation is performed on the entire character.

For example, in FIGS. 10A to 10C, FIG. 10A illustrates the reference image, FIG. 10B illustrates the image to be inspected, and FIG. 10C illustrates the difference image. The difference is thus calculated not only for a portion of the character but for the entire character, and the character thickening level is obtained from the difference. By the above process, a character characteristic can be quantified by the character thickening level α.

Here, when the character thickening level α takes a positive value, it is determined that the character has thickened, and so, control is performed so as to change the adjustment amount to thin the character. Meanwhile, when the character thickening level α takes a negative value, it is determined that the character has thinned, and so, control is performed so as to change the adjustment amount to thicken the character. The control for character quality adjustment is thus implemented based on the character thickening level α. First, the adjustment level Lc is determined based on the character thickening level α. This adjustment level Lc is determined by, for example, preparing in advance a table in which the character thickening level α and the adjustment amount have been associated and referencing that table.

FIG. 11 is a diagram illustrating an example of a table indicating a relationship between the character thickening level α and the adjustment level Lc.

For example, in a case of FIG. 10C, since the obtained character thickening level α is α≈−0.23, it can be determined that the adjustment level Lc is +1 upon referencing FIG. 11. When the adjustment level Lc is thus determined, the inspection apparatus 109 feeds back that obtained adjustment level Lc to the printing apparatus 107. The control for character quality adjustment can thus be implemented by the image processing unit 224 of the printing apparatus 107 performing the process for adjusting character quality using the adjustment level Lc starting from the next rendering process.

Here, an example of character image quality adjustment in the image processing unit 224 using the adjustment level Lc will be described with reference to FIGS. 12A to 12E.

FIGS. 12A to 12E are diagrams illustrating control for character quality adjustment by the image processing unit 224 of the printing apparatus 107 according to the first embodiment.

Figures 12A, 12B, 12C, 12D, 12E:
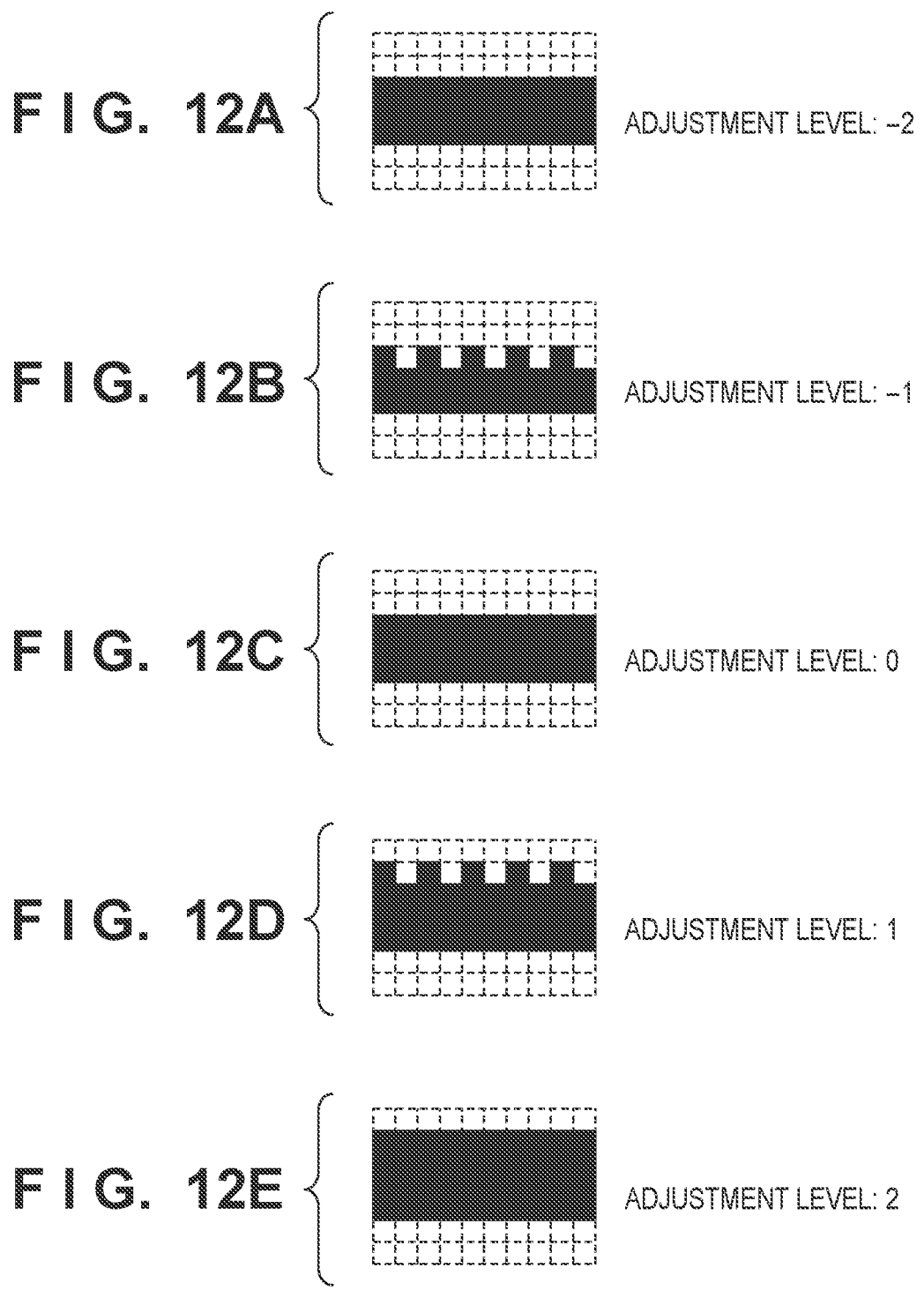

FIGS. 12A, 12B, 12D, and 12E illustrate, in order, images for which an image of FIG. 12C has been adjusted according to the values of the adjustment level Lc. Here, FIG. 12A illustrates a line for which the adjustment level is "−2" and which has been thinned by 1 (=0.5×2) pixel width. FIG. 12B illustrates a line for which the adjustment level is "−1" and which has been thinned by 0.5 (=0.5×1) pixel width. FIG. 12D illustrates a line for which the adjustment level is "+1" and which has been thickened by 0.5 (=0.5×1) pixel width. FIG. 12E illustrates an image of a line for which the adjustment level is "+2" and which has been thickened by 1 (=0.5×2) pixel width.

As illustrated in FIGS. 12A and 12E, adjustment for thinning or thickening by 1 pixel width is performed by subtracting or adding one pixel for all pixels on one side of an image portion indicating a line width in the image of the line width of FIG. 12C, which is an input image, Next, as illustrated in FIGS. 12B and 12D, adjustment for thinning or thickening by 0.5 pixel width is performed by subtracting or adding one pixel for every other pixel on one side of an image portion indicating a line width in the image of the line width of FIG. 12C, which is the input image, As described above, according to the first embodiment, the system is prevented from becoming larger by performing the inspection process of printed matter and an inspection for character quality adjustment in the same inspection apparatus, thereby eliminating the need to secure a large space for installing the system. Further, executing these processes in one inspection apparatus makes it possible to prevent the control of the system from becoming complicated, thereby simplifying various kinds of settings and operations by the user and making efficient operation possible.

Second Embodiment

In the first embodiment, the settings for character quality inspection is performed by designating the font type, size, and font in the screen of FIG. 5A. In contrast, in a second embodiment, the font type, size, and font are not designated. Since the system configuration, the hardware configuration of various apparatuses, and the like according to the second embodiment are the same as those of the above-described first embodiment, descriptions thereof will be omitted.

In the second embodiment, a description will be given for an operation for when all the setting items for character quality inspection have been set to automatic as illustrated in the setting screen of FIG. 5B.

Figure 14:
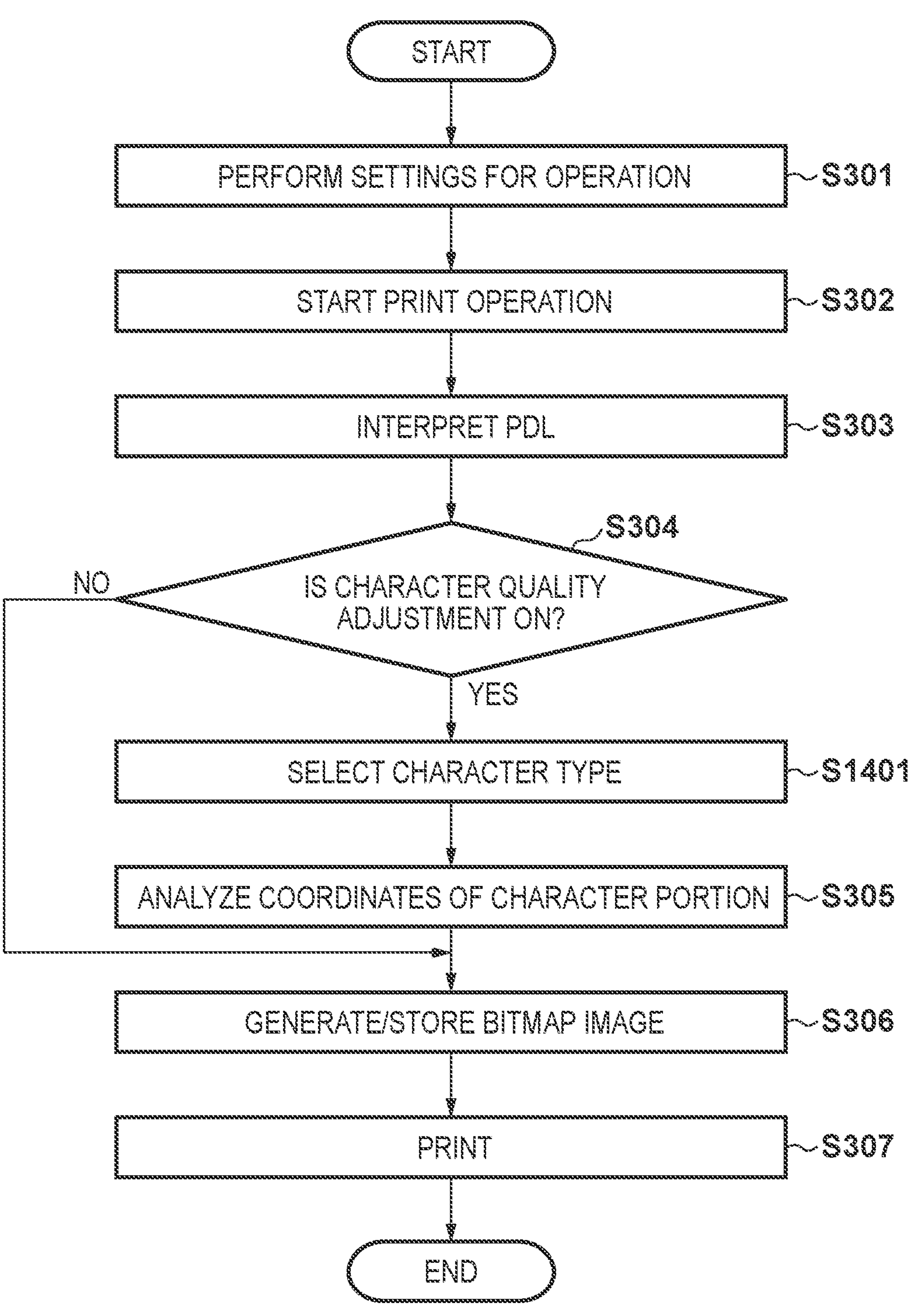
FIG. 14 is a flowchart for explaining a flow of a process in the printing system according to the second embodiment.

FIG. 14 is a flowchart for explaining a flow of a process in the printing system according to the second embodiment and is a flowchart for explaining a process up to printing of step S307 of FIG. 3. Processes that are common to FIG. 3 are denoted by the same reference numerals, and descriptions thereof will be omitted.

In step S304, the CPU 208 of the external controller 102 determines whether the character quality adjustment 402 has been set to on in step S301. Here, if the character quality adjustment 402 has been set to on, the process proceeds to step S1401, and the CPU 208 analyzes character designation of a PDL command of print data of each page based on PDL interpretation and automatically selects the character type to be used in character quality inspection. Here, at the time of PDL interpretation, character designation of a PDL command that is used in the page is analyzed. For example, regarding the font type, character defacement is more common in gothic fonts, and so, a character type for which gothic is included in the name of the font type is selected. Character blurring is more common in Ming types, and so, a character type for which Ming type is included in the name of the font type is selected. Regarding the font size, the smaller the size, the more likely the character will be defaced, blurred, and the like, and so, the smallest character type is selected among the used fonts. The higher the number of strokes of the character, the thinner the lines, and so, a character type with a higher number of strokes is selected. These are only examples of selection of a character type, and a configuration may be taken so as to select a character type that is frequently used and easily noticed or the like. When using the resolution of rendering for printing, the resolution can be the maximum resolution for rendering.

The process proceeds to step S305, and the CPU 208 of the external controller 102 obtains the coordinates of each character portion of the character selected in step S1401. The coordinate values obtained here can be used at the time of character quality inspection.

As described above, according to the second embodiment, by automating settings for the character and font of the settings for character quality inspection, settings and operations of the user become automated, thereby eliminating burden and making efficient operation possible.

Third Embodiment

In the second embodiment, the smallest character type among the used font sizes is selected. In contrast, in a third embodiment, the font is actually rendered and drawn in order to further increase the accuracy of character inspection. In particular, character inspection is implemented by extracting a font that includes a portion in which thinning, blurring, a break, and the like is likely to occur and registering that font in a font for character inspection. Since the system configuration, the hardware configuration of various apparatuses, and the like according to the third embodiment are the same as those of the above-described first and second embodiments, descriptions thereof will be omitted.

Similarly to the second embodiment, the third embodiment is an embodiment of an operation for when all the setting items for character quality inspection have been set to automatic as illustrated in the setting screen of FIG. 5B.

FIG. 15 is a flowchart for explaining a flow of a process for registering settings for a font for image quality inspection by the external controller 102 of the printing system according to the third embodiment. The setting for the font for image quality inspection of step S1301 of FIG. 13 is obtained based on the registration of settings for the font for image quality inspection indicated in this flowchart. The process indicated in this flowchart is realized by the CPU 208 of the external controller 102 executing a program that has been deployed in the memory 209.

First, in step S1501, the CPU 208 performs PDL interpretation for PDL data. Next, the process proceeds to step S1502, and the CPU 208 obtains settings for a font from the PDL data in the PDL interpretation. A description will be given for an example in which the character of the font is "a", the font size is 6 points (pt), and the font type is Times New Roman is obtained, for example.

Next, the process proceeds to step S1503, and the CPU 208 renders the font, which has been obtained in step S1502, at a predesignated resolution and converts it to a bitmap image.

Figure 16A:
FIGS. 16A to 16C are diagrams illustrating an example of development of a character font according to the third embodiment.
Figure 16B:
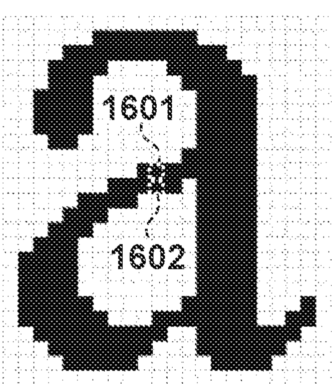
Figure 16C:
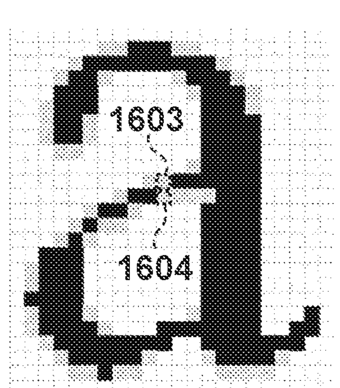

FIGS. 16A to 16C are diagrams illustrating an example of development of a character font according to the third embodiment.

FIG. 16A illustrates a font of the character "a". FIG. 16B illustrates a bitmap image for which the character "a" has been rendered at the resolution of 600 dpi. In rendering of a font, the font is rendered in binary as to which pixel to fill and which pixel not to fill. Therefore, as illustrated in FIG. 16B, it can be seen that the curved portions are more jagged than in FIG. 16A. In addition, one pixel of FIG. 16B indicates one 600-dpi pixel. As it can be seen from FIG. 16B, this bitmap image of the character is a single mass without a break.

Next, the process proceeds to step S1504, and since the character is jagged in pixel units at the resolution of 600 dpi, the CPU 208 performs an anti-aliasing process for making the jaggies less noticeable so as to bring the appearance closer to that of FIG. 16A. FIG. 16C illustrates an image after the anti-aliasing process. The anti-aliasing process is a process for giving a smoother appearance to curved portions by placing an intermediate color in the jagged portions, thereby pseudo-reducing the jaggedness, and is typically added when printing characters. That is, the image to actually be printed is the image of FIG. 16C, not of FIG. 16B.

Accordingly, in order to increase the accuracy of detection of thinning, blurring, and a break, the speed will have to be slowed by the amount of the anti-aliasing process, or it is necessary to set an inspection font for which thinning, blurring, and a break are to be detected in the anti-aliased image. For example, in FIG. 16B, a pixel 1601 and a pixel 1602 are black pixels. However, a pixel 1603 and a pixel 1604 corresponding to the anti-aliased pixel 1601 and pixel 1602 are in an intermediate tone. Accordingly, in the portions, the color of the character is lighter, and the line may be broken. Therefore, it is necessary to register the font of the anti-aliased image "a" in the font for inspection for detecting thinning, blurring, and a break.

Next, the process proceeds to step S1505, and since the determination cannot be easily performed when the tone is as is in an intermediate tone of FIG. 16C, the CPU 208 performs a binarization process on the image data on which the anti-aliasing process has been performed.

Figure 17:
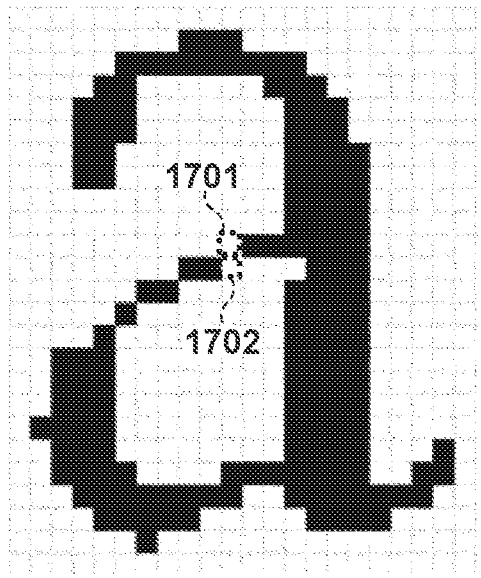
FIG. 17 is a diagram illustrating an example of an image in which a binarization process has been applied to image data on which an anti-aliasing process has been performed.

FIG. 17 is a diagram illustrating an example of an image for which the binarization process has been applied to image data on which the anti-aliasing process has been performed.

Then, the process proceeds to step S1506, and the CPU 208 determines the portion in which a break has occurred in the anti-aliased image data of FIG. 17 as blurred, broken, or the like from the rendered image of FIG. 16B that does not have a break. Here, the portions indicated by reference numerals 1701 and 1702 in FIG. 17 are detected as a break.

Here, in FIG. 16B and FIG. 17, utilizing that the font has become thinner, it may be determined that there is blurring or a break of the line by determining whether there is blurring or thinning of the line from the amount of decrease in the number of black pixels. The determination method is not limited to the process described in the third embodiment, and it does not matter what method is used so long as the blurring and a break of a line can be determined.

If the CPU 208 thus determines in step S1506 that there is blurring or a break of the line, the process proceeds to step S1507, and if the CPU 208 determines that there is no blurring or a break, the process proceeds to step S1508. In step S1507, the CPU 208 sets and registers the font character "a", the font size 6 points (pt), and the font type Times New Roman as the font for image quality inspection. When the font thus registered is used in the PDL data, the coordinate position of the font is analyzed and the character quality is adjusted based on an analyzed result, as described in the first embodiment.

Then, the process proceeds to step S1508, and the CPU 208 confirms whether the confirmation of the font used in the PDL data has been completed, and if it has been completed, the CPU 208 ends the process, and if the CPU 208 determines that it has not been completed, the CPU advances to step S1502 and obtains the next font. There are many types of fonts; therefore, a configuration may be taken so as to repeat the obtainment of a font from the smallest point as performed in the automation of the second embodiment and end the obtainment when the registration of a plurality of fonts for inspection has been completed. A configuration may also be taken so as not to register a font that is thick enough and has no small points as a font for inspection and not to perform inspection or adjustment of characters when no registration has been made.

In the third embodiment, the determination of blurring, a break, or the like of a line is performed by comparison of the rendered image and the anti-aliased image. In addition, performing determination using an image on which an edge process, which is a digital registration correction process to be performed at the time of printing, has been applied makes it possible to detect a break due to unevenness when switching registration for a fine line and is advantageous for increasing accuracy similarly to anti-aliasing.

As described above, according to the third embodiment, a font for character inspection is extracted using not only a rendered image but also an image after an edge process, such as an anti-aliased image. This makes it possible to reliably extract a character for which there is a possibility that a line may become thin, blurred, broken, or the like.

OTHER EMBODIMENTS

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-12031, filed Jan. 28, 2022, and Japanese Patent Application No. 2022-151804, filed Sep. 22, 2022, which are hereby incorporated by reference herein in their entirety.

What is claimed is:

1. An inspection apparatus operable to inspect printed matter, the apparatus comprising:

one or more controllers including one or more processors and one or more memories, the one or more controllers being configured to:

obtain image data to be inspected by reading printed matter;

in a case where an inspection process for inspecting a defect of the printed matter is set, perform an inspection process on the image data to be inspected, which has been obtained by reading the printed matter, based on a reference image;

in a case where a character quality inspection process for inspecting a quality of a character of the printed matter is set, perform a character quality inspection process on the image data to be inspected, which has been obtained by a reading process of reading the printed matter, based on the reference image; and make an instruction so as to adjust image data to be printed by a printing apparatus that generated the printed matter in accordance with an inspection result of the character quality inspection process on the image data which has been obtained by the reading process, wherein, in the character quality inspection process, the one or more controllers are further configured to:

cut out a character to be inspected from the image data to be inspected and the reference image, which are to be used, and obtain a character thickening level indicating thickening or thinning of a line width of the cut-out character, wherein, in making the instruction so as to adjust image data, the one or more controllers are configured to instruct an adjustment amount for the adjustment in accordance with the character thickening level, and wherein the character thickening level is determined based on a difference between the number of pixels whose difference data between each pixel value of pixels of a character portion of the character to be inspected of the image data to be inspected and each pixel value of corresponding pixels of the character portion to be inspected of the reference image is negative and the number of pixels whose difference data is positive, with respect to the number of pixels of the character portion to be inspected of the reference image.

2. The inspection apparatus according to claim 1, wherein the reference image is an image based on page description language (PDL) data that has been used for creating the printed matter.

3. The inspection apparatus according to claim 1, wherein the one or more controllers are further configured to:

convert a resolution of the image data to be inspected and a resolution of the reference image, which are to be used in the inspection process, wherein in the conversion of the resolution, the resolution of the image data to be inspected and the resolution of the reference image, which are to be used in the inspection process, are converted to a resolution that is lower than a resolution of the image data to be inspected and a resolution of the reference image, which are to be used in the character quality inspection process.

4. The inspection apparatus according to claim 1, wherein, in the character quality inspection process, the one or more controllers are configured to:

automatically determine a character type to be used in inspection of a quality of a character that is included in the image data to be inspected based on PDL data that has been used for the reference image.

5. The inspection apparatus according to claim 4, wherein in the determination of the character type, determination is performed using image data for which an edge process has been applied on image data of a character included in the printed matter.

6. The inspection apparatus according to claim 5, wherein the image data on which the edge process has been applied is image data on which an anti-aliasing process has been performed.

7. The inspection apparatus according to claim 5, wherein the image data on which the edge process has been applied is image data on which a digital registration correction process has been performed.

8. The inspection apparatus according to claim 1, wherein the one or more controllers are further configured to:

set either the inspection process or the character quality inspection process or both the inspection process and the character quality inspection process.

9. The inspection apparatus according to claim 8, wherein, in the setting, the one or more controllers are further configured to:

be capable of setting each of a resolution of the image data to be inspected and a resolution of the reference image, which are to be used in the inspection process, and a resolution of the image data to be inspected and a resolution of the reference image, which are to be used in the character quality inspection process.

10. The inspection apparatus according to claim 8, wherein settings for the character quality inspection process includes a character type to be inspected.

11. A printing system including an information processing apparatus that transmits print data to the printing apparatus and causes a printing apparatus to print the print data, the printing apparatus that generates printed matter by executing printing based on the print data, and an inspection apparatus, the inspection apparatus comprising:

one or more first controllers including one or more first processors and one or more first memories, the one or more first controllers being configured to:

obtain image data to be inspected by reading printed matter;

in a case where an inspection process for inspecting a defect of the printed matter is set, perform an inspection process on the image data to be inspected, which has been obtained by reading the printed matter, based on a reference image;

in a case where a character quality inspection process for inspecting a quality of a character of the printed matter is set, perform a character quality inspection process on the image data to be inspected, which has been obtained by a reading process of reading the printed matter, based on the reference image; and instruct so as to adjust image data to be printed by a printing apparatus that generated the printed matter in accordance with an inspection result of the character quality inspection process on the image data which has been obtained by the reading process, wherein, in the character quality inspection process, the one or more first controllers are further configured to:

cut out a character to be inspected from the image data to be inspected and the reference image, which are to be used, and obtain a character thickening level indicating thickening or thinning of a line width of the cut-out character, wherein, in making the instruction so as to adjust image data, the one or more controllers are configured to instruct an adjustment amount for the adjustment in accordance with the character thickening level, and the printing apparatus or the information processing apparatus comprising:

one or more second controllers including one or more second processors and one or more second memories, the one or more second controllers being configured to:

transmit, to the inspection apparatus, image data to be the reference images generated from print data, wherein, in the instruction, the one or more first controllers are configured to make an instruction for the adjustment to the printing apparatus or the information processing apparatus, and wherein the character thickening level is determined based on a difference between the number of pixels whose difference data between each pixel value of pixels of a character portion of the character to be inspected of the image data to be inspected and each pixel value of corresponding pixels of the character portion to be inspected of the reference image is negative and the number of pixels whose difference data is positive, with respect to the number of pixels of the character portion to be inspected of the reference image.

12. The printing system according to claim 11, wherein the one or more first controllers are further configured to:

set either the inspection process or the character quality inspection process or both the inspection process and the character quality inspection process.

13. The printing system according to claim 11, wherein the one or more first controllers are further configured to:

convert a resolution of the image data to be inspected and a resolution of the reference image, which are to be used in the inspection process, wherein, in the conversion of the resolution, the one or more first controllers are configured to:

convert the resolution of the image data to be inspected and the resolution of the reference image, which are to be used in the inspection process, to a resolution that is lower than a resolution of the image data to be inspected and a resolution of the reference image, which are to be used in the character quality inspection process.

14. A method of controlling an inspection apparatus including a reading unit configured to obtain image data to be inspected by reading printed matter and operable to inspect the printed matter, the method comprising:

in a case where an inspection process for inspecting a defect of the printed matter is set, performing an inspection process on the image data to be inspected, which has been obtained by reading the printed matter by the reading unit, based on a reference image;

in a case where a character quality inspection process for inspecting a quality of a character of the printed matter is set, performing a character quality inspection process on the image data to be inspected, which has been obtained by a reading process of reading the printed matter, based on the reference image; and instructing so as to adjust image data to be printed by a printing apparatus that generated the printed matter in accordance with an inspection result of the character quality inspection process on the image data which has been obtained by the reading process;

cutting out a character to be inspected from the image data to be inspected and the reference image, which are to be used, and obtain a character thickening level indicating thickening or thinning of a line width of the cut-out character; and in making the instruction so as to adjust image data, instructing an adjustment amount for the adjustment in accordance with the character thickening level, wherein the character thickening level is determined based on a difference between the number of pixels whose difference data between each pixel value of pixels of a character portion of the character to be inspected of the image data to be inspected and each pixel value of corresponding pixels of the character portion to be inspected of the reference image is negative and the number of pixels whose difference data is positive, with respect to the number of pixels of the character portion to be inspected of the reference image.

15. A non-transitory computer-readable storage medium storing a program for causing a processor to execute a method of controlling an inspection apparatus including a reading unit configured to obtain image data to be inspected by reading printed matter and operable to inspect the printed matter, the method comprising:

in a case where an inspection process for inspecting a defect of the printed matter is set, performing an inspection process on the image data to be inspected, which has been obtained by reading the printed matter by the reading unit, based on a reference image;

in a case where a character quality inspection process for inspecting a quality of a character of the printed matter is set, performing a character quality inspection process on the image data to be inspected, which has been obtained by a reading process of reading the printed matter, based on the reference image;

instructing so as to adjust image data to be printed by a printing apparatus that generated the printed matter in accordance with an inspection result of the character quality inspection process on the image data which has been obtained by the reading process;

cutting out a character to be inspected from the image data to be inspected and the reference image, which are to be used, and obtain a character thickening level indicating thickening or thinning of a line width of the cut-out character; and in making the instruction so as to adjust image data, instructing an adjustment amount for the adjustment in accordance with the character thickening level, wherein the character thickening level is determined based on a difference between the number of pixels whose difference data between each pixel value of pixels of a character portion of the character to be inspected of the image data to be inspected and each pixel value of corresponding pixels of the character portion to be inspected of the reference image is negative and the number of pixels whose difference data is positive, with respect to the number of pixels of the character portion to be inspected of the reference image.

* * * * *